US011751561B1

(12) United States Patent
Booker

(10) Patent No.: US 11,751,561 B1
(45) Date of Patent: Sep. 12, 2023

(54) PEST DETERRING DEVICE

(71) Applicant: Matthew Booker, Brandenton, FL (US)

(72) Inventor: Matthew Booker, Brandenton, FL (US)

( * ) Notice: Subject to any disclaimer, the term of this patent is extended or adjusted under 35 U.S.C. 154(b) by 603 days.

(21) Appl. No.: 17/008,802

(22) Filed: Sep. 1, 2020

(51) Int. Cl.
*A01M 29/18* (2011.01)
*A01M 29/34* (2011.01)

(52) U.S. Cl.
CPC ............ *A01M 29/18* (2013.01); *A01M 29/34* (2013.01)

(58) Field of Classification Search
CPC ...... A01M 29/02; A01M 29/18; A01M 29/34; A01M 1/00; A01M 1/06; A01M 1/2094; A01A 7/00; E05F 15/73; E05F 15/74; B05B 12/00; B05B 12/02; E05B 12/12; G05B 11/01
See application file for complete search history.

(56) References Cited

U.S. PATENT DOCUMENTS

| | | | |
|---|---|---|---|
| 4,999,818 A | 3/1991 | Malleolo | |
| 6,581,323 B2 | 6/2003 | Renzi | |
| 2013/0014429 A1* | 1/2013 | Meskouris | A01M 1/2094 43/139 |
| 2018/0106092 A1* | 4/2018 | Singh | E05F 15/74 |

FOREIGN PATENT DOCUMENTS

CA 203351145 U * 12/2013
WO WO-2018/116208 A1 * 6/2018

OTHER PUBLICATIONS

NPL Search (Jun. 13, 2023).*

* cited by examiner

*Primary Examiner* — Van T Trieu
(74) *Attorney, Agent, or Firm* — SANCHELIMA & ASSOCIATES, P.A.; Christian Sanchelima; Jesus Sanchelima

(57) ABSTRACT

A system for a pest deterring device including a barrier assembly, an ultrasonic assembly and a structure assembly is disclosed. The barrier assembly includes a barrier that has a rectangular triangular shape. Within the barrier is an ultrasonic transmitter that generates and emits ultrasonic waves. The ultrasonic waves are released from the barrier through apertures located thereon. The ultrasonic transmitter helps to deter and repel pests from entering a structure of the structure assembly even when the door is open. The barrier serves as a blockade that helps to increase the safety and cleanliness of users as the nuisance of pests such as rodents or snakes is eliminated by the barrier and the ultrasonic waves emitted by the ultrasonic transmitter.

7 Claims, 2 Drawing Sheets

PEST DETERRING DEVICE

II. BACKGROUND OF THE INVENTION

1. Field of the Invention

The present invention relates to a pest deterring device and, more particularly, to pest deterring device secured to a doorway to create a barrier to prevent pests from entering a building.

2. Description of the Related Art

Several designs for pest deterring devices have been designed in the past. None of them, however, include a rectangular triangular shaped ground barrier for the ground located below an open garage door wherein the barrier has an integral electronic ultrasonic transmitter for repelling and deterring pests, such as rodents and snakes, from entering a dwelling through an open garage door.

Applicant believes that a related reference corresponds to U.S. Pat. No. 6,581,323 for a device to prevent pests from entering a building through a garage door opening comprising a battier device attached below the garage door. Applicant believes that another related reference refers to U.S. Pat. No. 4,999,818 for an electronic ultrasonic signal transmitting device for deterring a pest or rodent from a certain area. None of these references, however, teach of a ground barrier with an integral electronic ultrasonic transmitter that deters pests.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a pest deterring device that helps to keep pests from entering a building.

It is another object of this invention to provide a pest deterring device that can be retrofitted to doorways.

It is also another object of the present to provide a pest deterring device that establishes a barrier.

It is still another object of the present invention to provide a pest deterring device that increases the cleanliness and health standards of a building.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE EMBODIMENTS OF THE INVENTION

Figure 1:
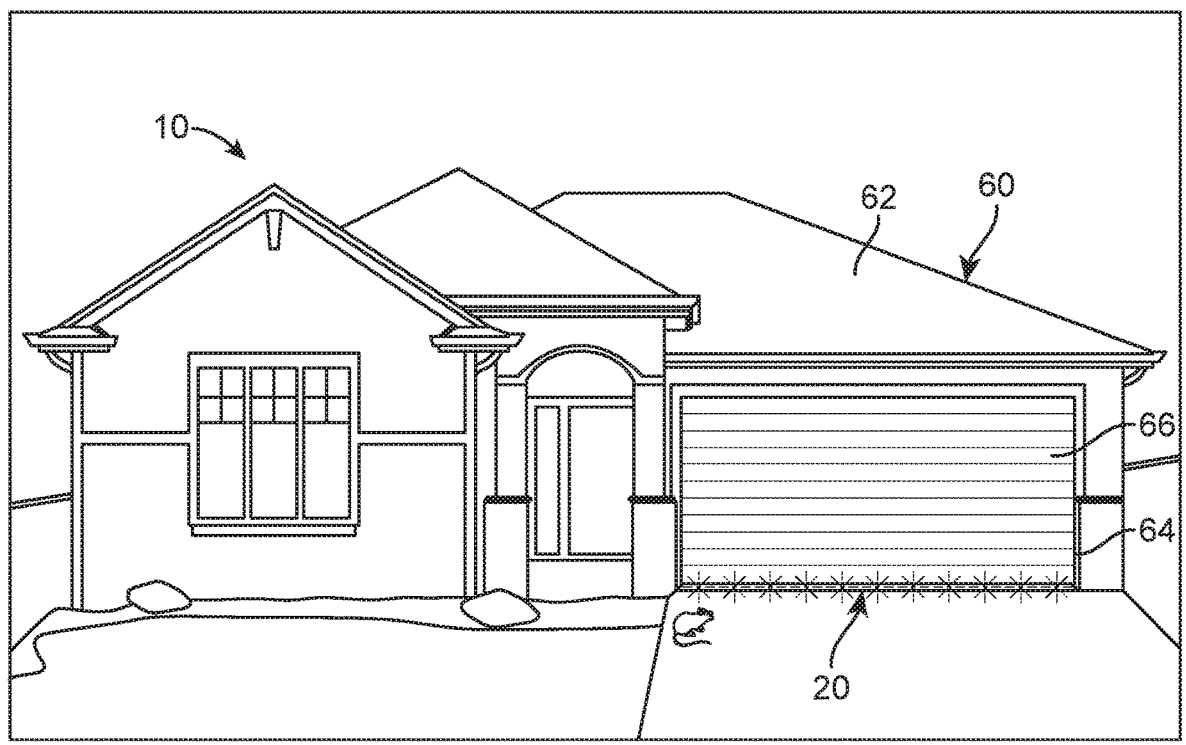
FIG. 1 represents an operational view in which pest deterring device 10 is secured to a doorway 62.

Referring now to the drawings, where the present invention is generally referred to with numeral 10, it can be observed that a pest deterring device 10 basically includes a barrier assembly 20, an ultrasonic assembly 40 and a structure assembly 60.

Pest deterring device 10, as best shown in FIG. 1, may be used to prevent pests from entering a building such as a dwelling, office or establishment. Pest deterring device 10 may be used to establish a blockade that prevents pests from accessing an interior of the building with the use of ultrasonic waves. The blockade established remains unobtrusive allowing for people to enter the building unbothered and unharmed as usual. It is to be understood that preferably, pest deterring device 10 may be waterproof as it will be partly outdoor and will need to withstand the elements.

Figure 2:
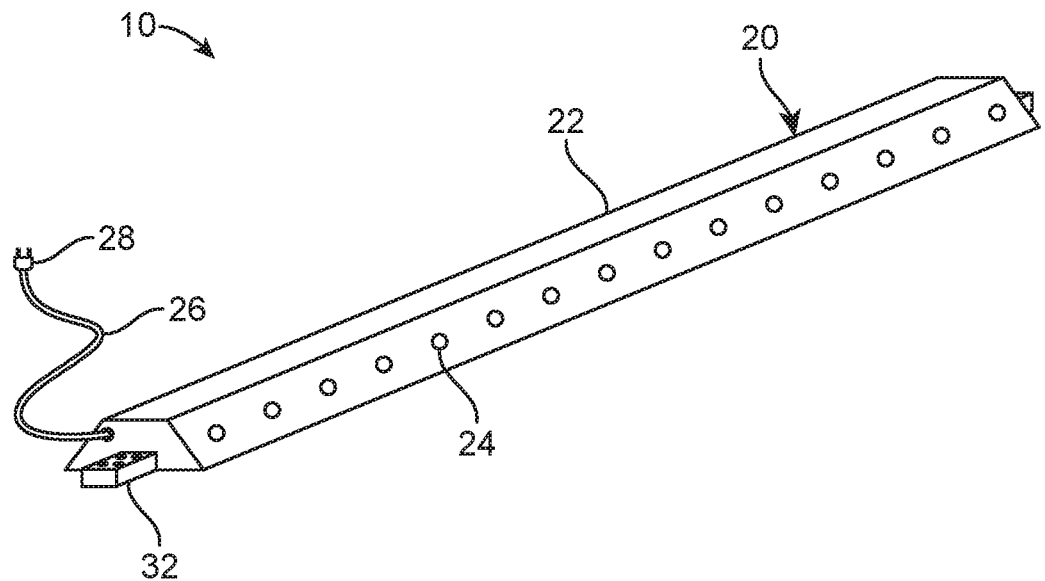
FIG. 2 shows an isometric view of the pest deterring device 10.
Figure 3:
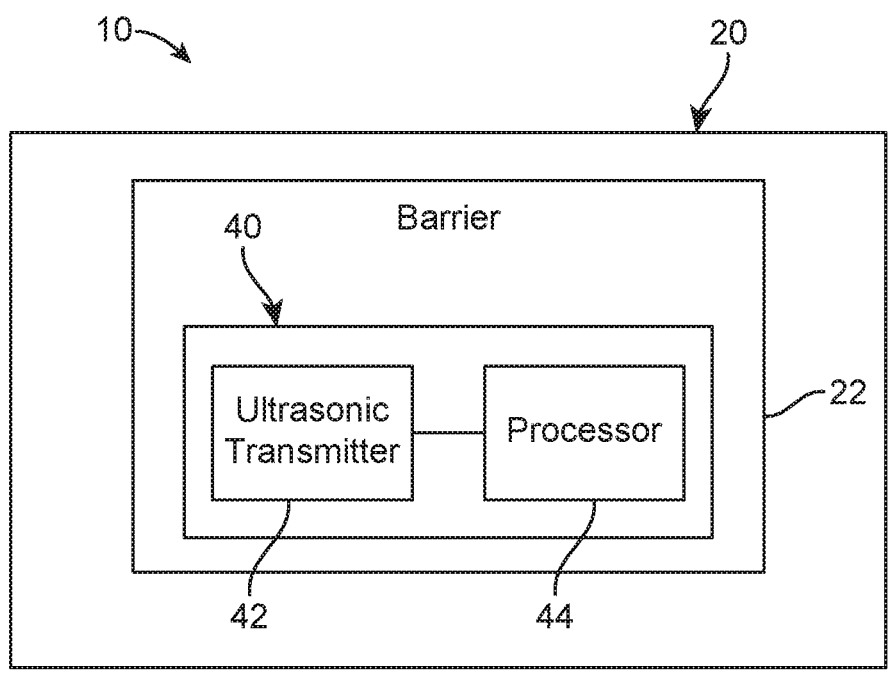
FIG. 3 illustrates a diagram showing the ultrasonic assembly 40.

As best shown in FIGS. 1-3, barrier assembly 20 may include a barrier 22. Barrier 22 may create a ground barrier or blockade between the interior and the exterior of a structure 62 of structure assembly 60. Barrier 22 may serve as a housing for ultrasonic assembly 40. Barrier 22 may have an elongated body. Preferably, barrier 22 may have a trapezoidal or rectangular triangular shape. Thereby resulting in barrier 22 having a front and rear side that are sloped. It may be suitable for barrier 22 to be tapered. Barrier 22 may be made of materials such as aluminum, wood, metal, plastic, rubber or combinations thereof. It is to be understood that barrier 22 may be rigid to be able to support users stepping thereon. Barrier 22 may also be rigid enough to support the weight of a vehicle on or rolling over barrier 22. In one implementation, barrier 22 may be hollow. It is to be understood that barrier 22 may have a length greater than a height thereof.

Importantly, barrier 22 may include apertures 24 on a front side thereof. Apertures 24 may face an exterior of structure 62. Apertures 24 may be evenly spaced apart and parallel to each other. It may be suitable for apertures 24 to extend an entire length of barrier 22. In one embodiment, apertures 24 may be circular in shape. The ultrasonic waves generated by the present invention may be released through apertures 24 to deter pests from approaching barrier 22 and entering structure 62.

For full functionally, it may be necessary to connect pest deterring device 10 to a power source. As such barrier 22 may include a power cord 26 with a power socket 28. Power cord 26 may be mounted to a distal end of barrier 22. It is to be understood that power cord 26 may be of a predetermined length that is sufficiently long enough to reach the desired power source. Power socket 28 may be attached to a distal end of power cord 26. Power socket 28 may permit connecting of power cord 26 to the power source to provide power and energy to pest deterring device 10.

On lateral ends of barrier 22 may be connectors 32. Connectors 32 may be used to interconnect additional of barrier 22 together for increasing the length of pest deterring device 10. Preferably, all of barrier 22 interconnected may remain on a same horizontal plane. Thereby allowing for a larger blockade or ground barrier to be established. It is to be understood that one of connectors 32 may be a male member and another of connectors 32 may be a female member. Suitably, connectors 32 may extend outwardly and away from barrier 22. One of connectors 32 of barrier 22 may cooperate with another on connectors 32 on an additional of barrier 22. Allowing for all desired of barrier 22 to be connected together. Barrier 22 and additional of barrier 22 may be interconnect adjacently and in constant abutting contact with each other.

Housed within barrier 22 may be ultrasonic assembly 40. Ultrasonic assembly 40 may include ultrasonic transmitter 42 and a processor 44. It is to be understood that ultrasonic transmitter 42 may alternatively be referred to as an integral electronic ultrasonic transmitter. Ultrasonic transmitter 42 may be attached to processor 44. Processor 44 may be connected to power cord 26 allowing for energy and power to be provided to processor 44 when power cord 26 is connected to the desired power source. It is to be understood that processor 44 may then be able to provide power to ultrasonic transmitter 42 for proper function thereof.

Ultrasonic transmitter 42 may generate and emit ultrasonic waves that can be used to deter pests. The ultrasonic waves may be released from within barrier 22 through apertures 24. The ultrasonic waves are to be disruptive or unpleasant to pests that may take an interest in approaching, exploring or entering structure 62. It may be suitable for the ultrasonic waves to be constantly emitted. Alternatively, the ultrasonic waves may be configured to emit for a predetermined length of time on a predetermined schedule. It may also be suitable to control the strength of the ultrasonic waves emitted by ultrasonic transmitter 42 to deter specific kinds of pests that may be sensitive to a particular range of ultrasonic waves. In one implementation, pest deterring device 10 may include controls to power on and off ultrasonic transmitter 42. Additionally, pest deterring device 10 may further include controls to configure the magnitude and strength of the ultrasonic waves emitted by ultrasonic transmitter 42. Instead, pests are kept at a distance from barrier 22 and structure 62 due to the bothersome ultrasonic waves being emitted. It is to be understood that the ultrasonic waves emitted may be unobtrusive to users in the vicinity.

Barrier 22 may preferably be on a ground surface. Barrier 22 may extend an entire length of a doorway 64 of structure 62 to ensure pest are kept away from the structure 62. Barrier 22 may suitably be secured to an opening of structure 62, in an alternate embodiment. Multiple of barrier 22 may be secured together to fit properly along larger of doorway 64 for larger barriers or blockades to be established. Importantly, barrier 22 may be entirely below a door 66 of structure 62. When closed, door 66 may rest atop of barrier 22. Door 66 may still open and close as normal even with barrier 22 secured to doorway 64. Door 66 may be a standard door or a garage door, for example. Barrier 22 may be in constant abutting contact with the ground surface or doorway 64 and door 66, simultaneously, when door 66 is closed. Barrier 22 may be sandwiched between the ground surface and door 66 to prevent an entrance into structure 62 being established for bothersome pests, such as rodents and snakes. Ultrasonic transmitter 42 may emit ultrasonic waves that are bothersome and deter pests form structure 62 even when door 66 is opened. Thereby resulting in increased cleanliness as there are no unexpected pests and their nuisances to deal with due to pest deterring device 10. The safety of the user is also increased as some pests and their bites are dangerous to users.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a pest deterring device, comprising:
   a) a barrier assembly including a barrier, said barrier having apertures, said barrier is waterproof, wherein said barrier has an elongated trapezoidal shape, said barrier may include apertures on a front side thereof, wherein said front side and a rear side of said barrier slope, wherein said apertures are evenly spaced and parallel to each other extending through a central portion of a length of sia barrier, wherein said barrier includes connectors on distal ends thereof, said connectors adapted to connect said barrier to additional of said barrier together, said connectors have a rectangular shape said connectors extend outwardly and away from said distal ends, wherein a top face and a bottom face of said barrier are planar;
   b) an ultrasonic assembly including an ultrasonic transmitter enclosed within said barrier, said ultrasonic transmitter emitting ultrasonic waves that escape from within said barrier through said apertures; and
   c) a structure assembly including a structure with a doorway and a door secured to said doorway, said barrier secured along said doorway, said door resting atop of said barrier when closed, said ultrasonic waves emitted deterring pests from approaching and entering said structure through said doorway, wherein said barrier is sandwiched between said door and said doorway when said door is closes.

2. The system of claim 1, wherein one of said connectors is a male member and another of said connectors is a female member.

3. The system of claim 1, wherein said barrier is located at a bottom of said doorway, said barrier extending an entire length of said doorway.

4. The system of claim 1, wherein said barrier includes a power cord and a power socket adapted to provide power to said ultrasonic transmitter when connected to a power source, said power cord attached to a lateral side of said barrier, said power socket attached to a distal end of said power cord.

5. The system of claim 4, wherein said ultrasonic assembly includes a processor, said processor secured within said barrier, said ultrasonic transmitter attached to said processor, said processor being powered when said power cord is connected to the power source.

6. The system of claim 1, wherein said barrier and additional of said barrier are adjacent to each other and in abutting contact once interconnected by said connectors.

7. A system for a pest deterring device, consisting of:
   a) a barrier assembly including a barrier, said barrier having apertures, said barrier is waterproof, wherein said barrier has an elongated trapezoidal shape, said barrier may include apertures on a front side thereof, wherein said front side and a rear side of said barrier slope, wherein said apertures are evenly spaced and parallel to each other extending through a central portion of a length of sia barrier, wherein said barrier includes connectors on distal ends thereof, said connectors adapted to connect said barrier to additional of said barrier together, said connectors have a rectangular shape, said connectors extend outwardly and away from said distal ends, wherein a top face and a bottom face of said barrier are planar, wherein one of said connectors is a male member and another of said connectors is a female member, wherein said barrier and additional of said barrier are adjacent to each other and in abutting contact once interconnected by said connectors;

b) an ultrasonic assembly including an ultrasonic transmitter enclosed within said barrier, said ultrasonic transmitter emitting ultrasonic waves that escape from within said barrier through said apertures; and c) a structure assembly including a structure with a doorway and a door secured to said doorway, said barrier secured along said doorway, said door resting atop of said barrier when closed, said ultrasonic waves emitted deterring pests from approaching and entering said structure through said doorway, wherein said barrier is sandwiched between said structure and floor, sad barrier is secured to an opening of said structure by means of said connectors, wherein said barrier is located at a bottom of said doorway, said barrier extending an entire length of said doorway, wherein said barrier includes a power cord and a power socket adapted to provide power to said ultrasonic transmitter when connected to a power source, said power cord attached to a lateral side of said barrier, said power socket attached to a distal end of said power cord, wherein said ultrasonic assembly includes a processor, said processor secured within said barrier, said ultrasonic transmitter attached to said processor, said processor being powered when said power cord is connected to the power source.

* * * * *